United States Patent [19]

Gjovik

[11] Patent Number: 5,713,436
[45] Date of Patent: Feb. 3, 1998

[54] SOLENOID OPERATED UNIDIRECTIONAL WHEEL BRAKE

[75] Inventor: Rolan C. Gjovik, Colfax, Wis.

[73] Assignee: Gjovik Enterprises, Colfax, Wis.

[21] Appl. No.: 518,756

[22] Filed: Aug. 24, 1995

[51] Int. Cl.⁶ .................. B60L 7/00; B60T 1/00; F16D 69/00
[52] U.S. Cl. .................. 188/163; 188/29; 188/30; 188/265
[58] Field of Search .................. 188/29, 30, 68, 188/57, 24.11, 265, 163; 303/3, 89; 70/225, 226, 228

[56] References Cited

U.S. PATENT DOCUMENTS

| | | | |
|---|---|---|---|
| 502,624 | 8/1893 | Holcomb | 188/163 X |
| 2,038,987 | 4/1936 | Brown. | |
| 2,259,987 | 10/1941 | Bailie | 280/1.19 |
| 2,438,154 | 3/1948 | Dickens. | |
| 2,702,101 | 2/1955 | Dewhurst | 188/171 |
| 3,339,681 | 9/1967 | Holladay | 188/163 |
| 4,410,195 | 10/1983 | Agustin | 188/30 |
| 4,515,259 | 5/1985 | Ha | 188/353 |
| 4,603,875 | 8/1986 | Boughton et al. | 280/272 |
| 5,388,672 | 2/1995 | Hartley | 188/30 X |
| 5,452,775 | 9/1995 | Bussinger | 188/29 X |

*Primary Examiner*—Peter M. Poon
*Attorney, Agent, or Firm*—Patent Law Offices of Rick Martin, P.C.

[57] ABSTRACT

A motorcycle rear wheel brake functions to allow the driver to lock the rear wheel on an upward incline. This prevents the motorcycle from rolling backwards while freeing the driver's hands and feet. A simple hinge arrangement wedges the rear wheel and the hinge into the rear fork. A solenoid activates the hinge. An alternate embodiment uses a mechanical cable to move the hinge.

9 Claims, 2 Drawing Sheets

SOLENOID OPERATED UNIDIRECTIONAL WHEEL BRAKE

FIELD OF INVENTION

The present invention relates to temporarily locking the rear wheel of a heavy motorcycle to assist the driver in starting off uphill.

BACKGROUND OF THE INVENTION

Touring motorcycles hauling trailers can weigh two thousand pounds. When stopped on an uphill incline it is tricky to start off. Starting off requires leaning the motorcycle to the left and putting the right foot down on the rear brake pedal. Then the driver must rev the engine and release the clutch while releasing the rear brake with his right foot. If the driver stalls the engine, then he must apply either the front or rear brakes to stop the rig from rolling backwards. If the front brake is used, and the front wheel turns, then the rig could fall. If the rear brake is used and the rig tilts to the right while the driver's right foot is on the brake, then the rig can fall. Also while starting off with only the left foot on the ground in order to maintain the rear brake on, the left foot can slip on sand or water and the rig can fall.

Various hill holder brake systems are known for cars, but no relevant prior art is known in the motorcycle industry. The present invention allows the driver to push a button and prevent his rear tire from rolling backwards. Then the driver can maintain both feet on the ground while starting off. The forward movement of the rear tire will automatically release the wheel lock.

SUMMARY OF THE INVENTION

The primary object of the present invention is to provide a push button activated rear wheel lock for a motorcycle.

Another object of the present invention is to provide an automatic release of the wheel lock upon the forward rotation of the rear wheel.

The forward fork of the rear wheel of a motorcycle is used to mount a hinge. The moving arm of the hinge can wedge against the rear wheel to lock the wheel from going backwards. A solenoid plunger is activated by the driver to swing the moving arm against the wheel as desired on inclines. By moving forward the moving arm is pulled away from engagement with the wheel by a spring.

Other objects of this invention will appear from the following description and appended claims, reference being had to the accompanying drawings forming a part of this specification wherein like reference characters designate corresponding parts in the several views.

BRIEF DESCRIPTION OF THE DRAWINGS

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figure 1:
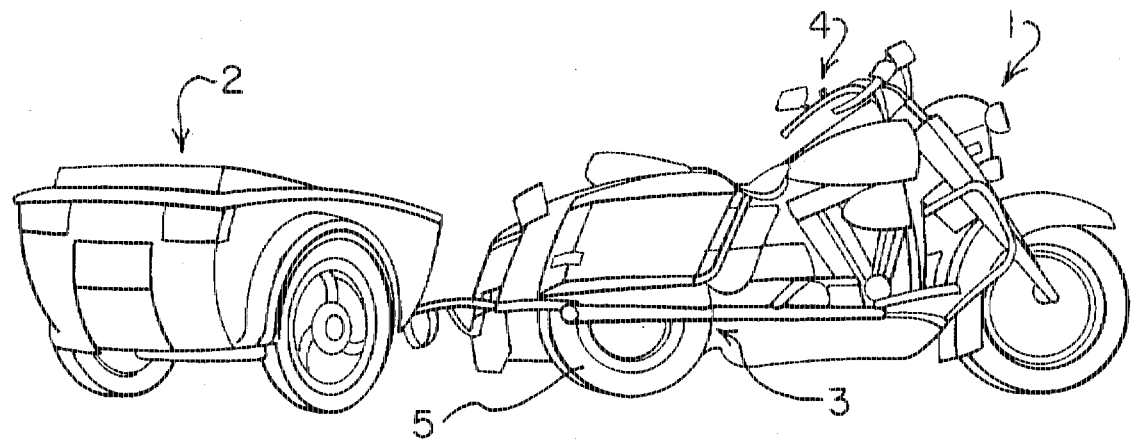
FIG. 1 is a side perspective view of a touring motorcycle towing a trailer.
Figure 2:
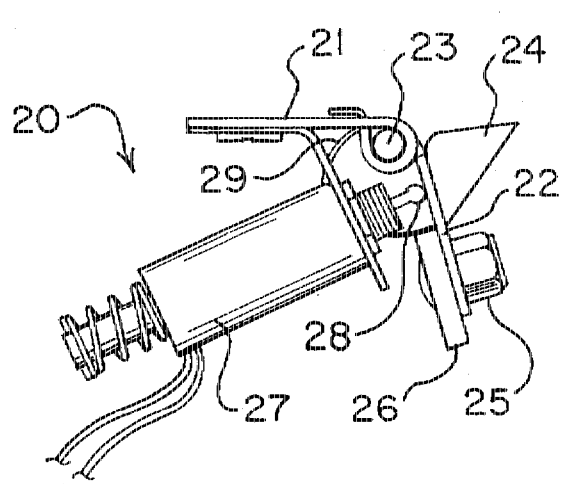
FIG. 2 is a side plan view of the preferred embodiment of the wheel lock.

Referring first to FIG. 1 a motorcycle 1 is towing a trailer 2. The wheel lock 20 shown in FIG. 2 is installed on the frame at fork 3. A pushbutton 4 activates the wheel lock 20, thus preventing the rear wheel 5 from rolling backwards on an incline.

FIG. 2 shows a mounting plate 21 pivotally connected to a locking plate 22 using a traditional bolt 23 in a hinge arrangement. An optional adjustment plate 26 is attached to locking plate 22 by bolts 25. The locking plate 22 has a stop 24 welded to it.

Figure 5:
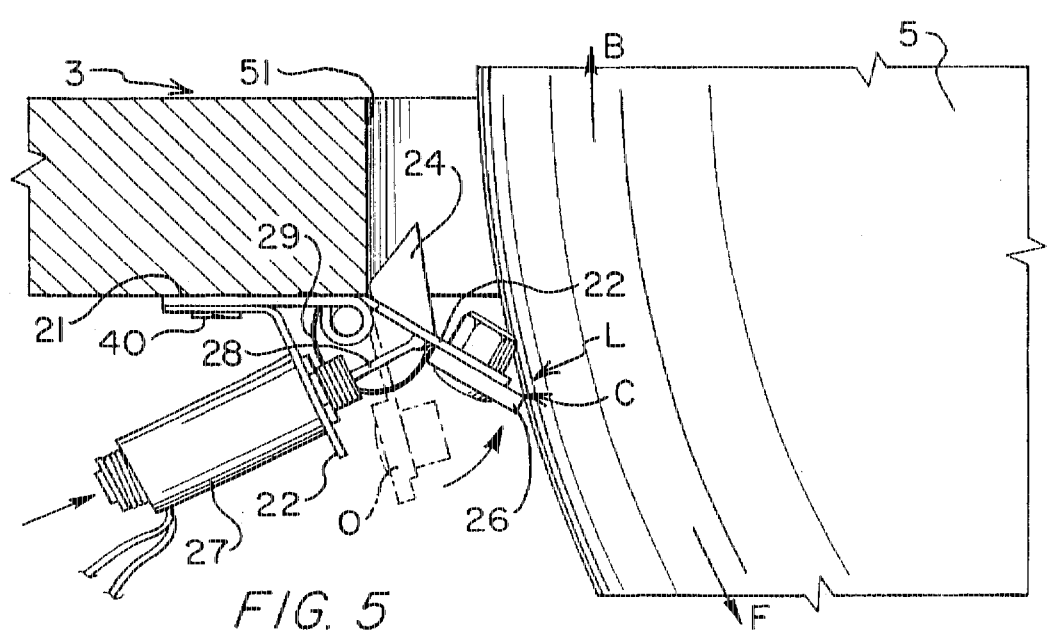
FIG. 5 is a side plan view of the embodiment of FIG. 4.

Upon activation by the driver the solenoid 27 forces the plunger 28 against the locking plate 22, thereby locking the rear wheel 5 as shown at position L in FIG. 5. The locking plate 22 (or the adjustment plate 26 if installed) wedges against the rear wheel 5 at point C. The rear wheel 5 cannot rotate backwards in direction B because the stop 24 butts against the frame face 51, thus preventing the locking arm 22 from pivoting further in direction B. FIG. 5 shows the locking plate 22 partially locked at position L and open in position O. A spring 29 returns the locking plate 22 to the open position after the rear wheel 5 rotates forward in direction F. Gravity also assists returning the locking plate 22 to the open position.

Figure 3:
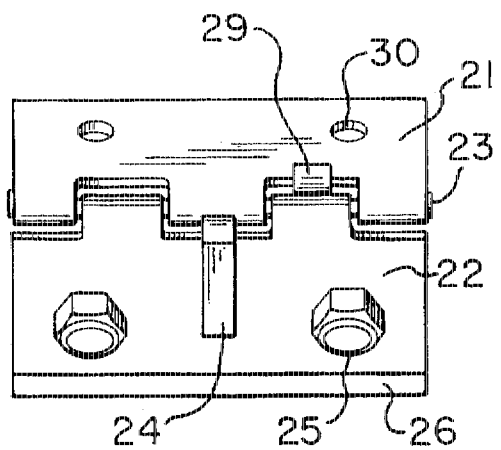
FIG. 3 is a front plan view of the preferred embodiment of FIG. 2.
Figure 4:
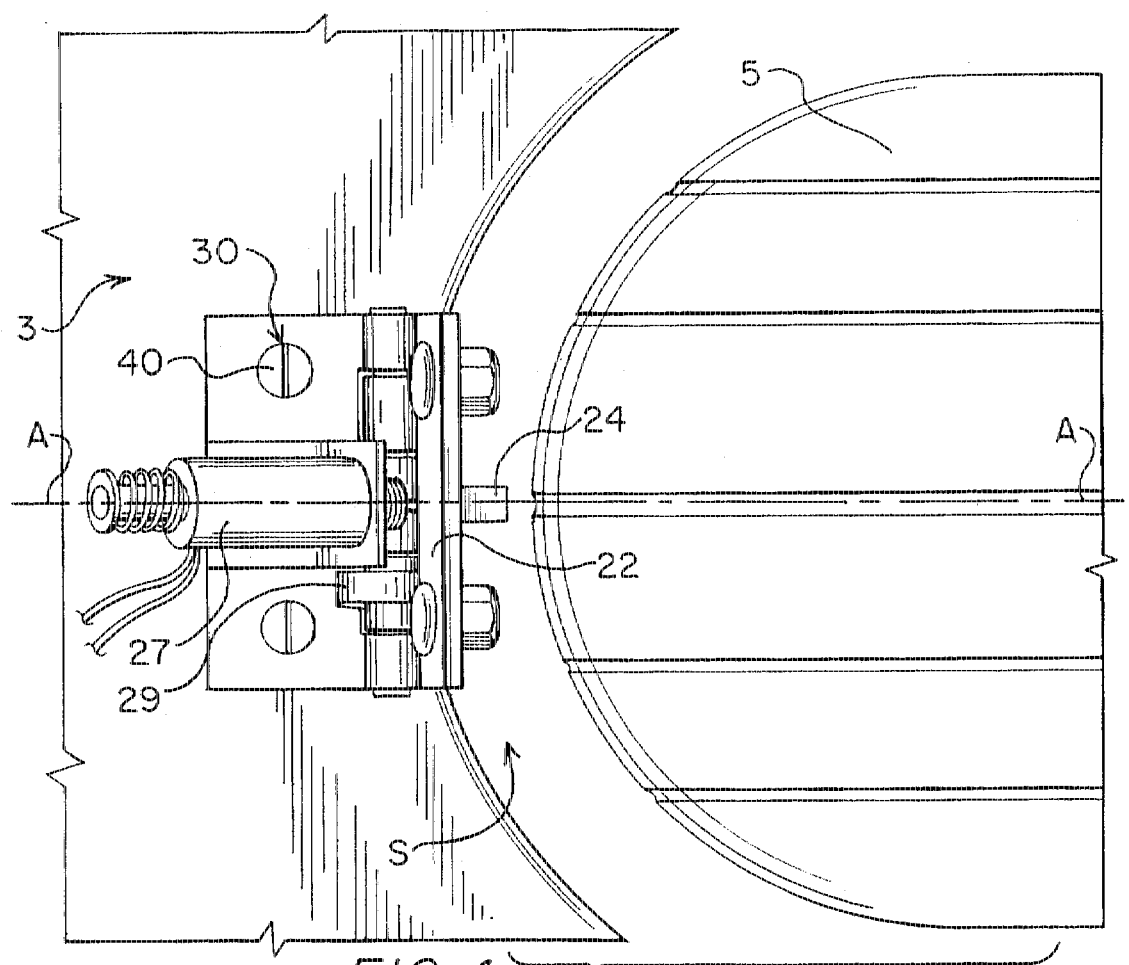
FIG. 4 is a bottom plan view of the preferred embodiment installed on a motorcycle.

Referring next to FIGS. 3,4 it can be seen how bolts 40 mount through holes 30 to secure the mounting plate 21 to the frame at fork 3. Preferably the wheel lock 20 is in axial alignment with rear wheel 5 along line A—A. Normally the space S between the fork 3 and the rear wheel 5 allows the rear wheel to rotate freely. The locking plate 22 forms a wedge in space S, thus preventing the rear wheel 5 from rotating backwards.

An alternate embodiment (not shown) simply uses a mechanical push/pull cable to move the locking plate 22 to the locked and open positions.

Although the present invention has been described with reference to preferred embodiments, numerous modifications and variations can be made and still the result will come within the scope of the invention. No limitation with respect to the specific embodiments disclosed herein is intended or should be inferred.

I claim:

1. A rear wheel lock for a motorcycle, said lock comprising:
    a mounting plate secured to a rear wheel fork;
    a locking plate pivotally attached to the mounting plate in a space between the fork and the rear wheel;
    a pivot means functioning to pivot the locking plate against the rear wheel into a wedged position, thereby preventing a backward rotation;
    a stop means functioning to prevent the locking plate from pivoting beyond the wedged position; and
    a return means functioning to return the locking plate to a neutral position.

2. The lock of claim 1, wherein the pivot means further comprises a driver activated solenoid having a plunger.

3. The lock of claim 1, wherein the stop means further comprises a wedge attached to the locking plate which butts against the rear wheel fork.

4. The lock of claim 1, wherein the return means further comprises a spring.

5. A rear wheel lock for a motorcycle, said lock comprising:
- a hinge mounted to a rear fork;
- said hinge further comprising a moving member that pivots in a space between a rear wheel and the rear fork;
- a pivot activating means functioning to controllably move the moving member against the rear wheel, thereby wedging the rear wheel to prevent a backward rotation; and
- a moving member return means functioning to return the moving member to a neutral position when the rear wheel rotates forward.

6. The lock of claim 5, wherein the pivot activating means further comprises a driver operated solenoid having a plunger.

7. The lock of claim 5, wherein the moving member return means further comprises a spring.

8. The lock of claim 5, wherein the moving member further comprises a stop to prevent an over-pivoting.

9. A unidirectional wheel brake for a vehicle, said wheel brake comprising:
- hinge mounted to a frame member of a vehicle;
- said hinge further comprising a moving member that pivots in a space between a wheel of the vehicle and the frame member;
- a pivot activating means functioning to controllably move the moving member against the wheel thereby wedging the wheel to prevent a backward rotation; and
- a moving member return means functioning to return the moving member to a neutral position when the wheel rotates forward.

* * * * *